United States Patent
Hylla

[11] Patent Number: 5,957,233
[45] Date of Patent: Sep. 28, 1999

[54] MOTORCYCLE RUNNING BOARD SKIRT

[76] Inventor: Thomas R. Hylla, 21258 Franklin Rd., Clearwater, Minn. 55320

[21] Appl. No.: 08/723,887

[22] Filed: Oct. 1, 1996

[51] Int. Cl.$^6$ .................................................. B62D 61/02
[52] U.S. Cl. ...................... 180/219; 280/152.3; D12/126
[58] Field of Search ................................. 280/768, 852, 280/849, 152.1, 152.3, 291; 180/219, 90.6; D12/126, 114, 186, 203

[56] References Cited

U.S. PATENT DOCUMENTS

| | | | |
|---|---|---|---|
| D. 107,241 | 10/1937 | Kraeft | D12/126 |
| 1,185,458 | 5/1916 | Woodley | 280/164.1 |
| 2,135,218 | 11/1938 | Pawsat | 280/152.1 |
| 2,422,836 | 6/1947 | Lariviere | 280/152.1 |
| 4,311,320 | 1/1982 | Waters, Jr. | 280/163 |
| 5,577,747 | 11/1996 | Ogawa et al. | 180/220 |

*Primary Examiner*—Brian Johnson
*Assistant Examiner*—Jim McClellan

[57] ABSTRACT

A new Motorcycle Running Board Skirt for offering an accessory that adds to the appearance of a motorcycle while deflecting dirt, mud, water, and so forth. The inventive device includes a cover, a frame, a cover attachment, and a skirt attachment. In use, the Motorcycle Running Board Skirt 10 is fastened to an underside of a running board 4 of a motorcycle 2 by using the same shoulder bolts 22 as provided with the motorcycle 2. The Motorcycle Running Board Skirt 10 has a frame 14 which is flexible in order to survive contact with the ground and a cover 12 which has a shape that avoids contact with the ground.

11 Claims, 3 Drawing Sheets

MOTORCYCLE RUNNING BOARD SKIRT

BACKGROUND OF THE INVENTION

1. Field of the Invention

The present invention relates to motorcycle accessories and more particularly pertains to a new Motorcycle Running Hoard Skirt for offering an accessory that adds to the appearance of a motorcycle while deflecting dirt, mud, water, and so forth.

2. Description of the Prior Art

The use of motorcycle accessories is known in the prior art. More specifically, motorcycle accessories heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new Motorcycle Running Board Skirt. The inventive device includes a cover, a frame, a cover attachment means, and a skirt attachment means.

In these respects, the Motorcycle Running Board Skirt according to the present invention substantially departs from the conventional concepts and designs of the prior art, and in so doing provides an apparatus primarily developed for the purpose of offering an accessory that adds to the appearance of a motorcycle while deflecting dirt, mud, water, and so forth.

SUMMARY OF THE INVENTION

In view of the foregoing disadvantages inherent in the known types of motorcycle accessories now present in the prior art, the present invention provides a new Motorcycle Running Board Skirt construction wherein the same can be utilized for offering an accessory that adds to the appearance of a motorcycle while deflecting dirt, mud, water, and so forth.

The general purpose of the present invention, which will be described subsequently in greater detail, is to provide a new Motorcycle Running Board Skirt apparatus and method which has many of the advantages of the motorcycle accessories mentioned heretofore and many novel features that result in a new Motorcycle Running Board Skirt which is not anticipated, rendered obvious, suggested, or even implied by any of the prior art motorcycle accessories, either alone or in any combination thereof.

To attain this, the present invention generally comprises a cover, a frame, a cover attachment means, and a skirt attachment means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Motorcycle Running Board Skirt apparatus and method which has many of the advantages of the motorcycle accessories mentioned heretofore and many novel features that result in a new Motorcycle Running Board Skirt which is not anticipated, rendered obvious, suggested, or even implied by any of the prior art motorcycle accessories, either alone or in any combination thereof.

It is another object of the present invention to provide a new Motorcycle Running Board Skirt which may be easily and efficiently manufactured and marketed.

It is a further object of the present invention to provide a new Motorcycle Running Board Skirt which is of a durable and reliable construction.

An even further object of the present invention is to provide a new Motorcycle Running Board Skirt which is susceptible of a low cost of manufacture with regard to both materials and labor, and which accordingly is then susceptible of low prices of sale to the consuming public, thereby making such Motorcycle Running Board Skirt economically available to the buying public.

Still yet another object of the present invention is to provide a new Motorcycle Running Board Skirt which provides in the apparatuses and methods of the prior art some of the advantages thereof, while simultaneously overcoming some of the disadvantages normally associated therewith.

Still another object of the present invention is to provide a new Motorcycle Running Board Skirt for offering an accessory that adds to the appearance of a motorcycle while deflecting dirt, mud, water, and so forth.

Yet another object of the present invention is to provide a new Motorcycle Running Board Skirt which includes a cover, a frame, a cover attachment means, and a skirt attachment means.

Still yet another object of the present invention is to provide a new Motorcycle Running Board Skirt that is easily installed onto an existing motorcycle which has already been in service or a new motorcycle as it is assembled in a factory.

Even still another object of the present invention is to provide a new Motorcycle Running Board Skirt that is curved, shaped, and flexible allowing it to avoid some contact with the ground and to survive other contact with the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
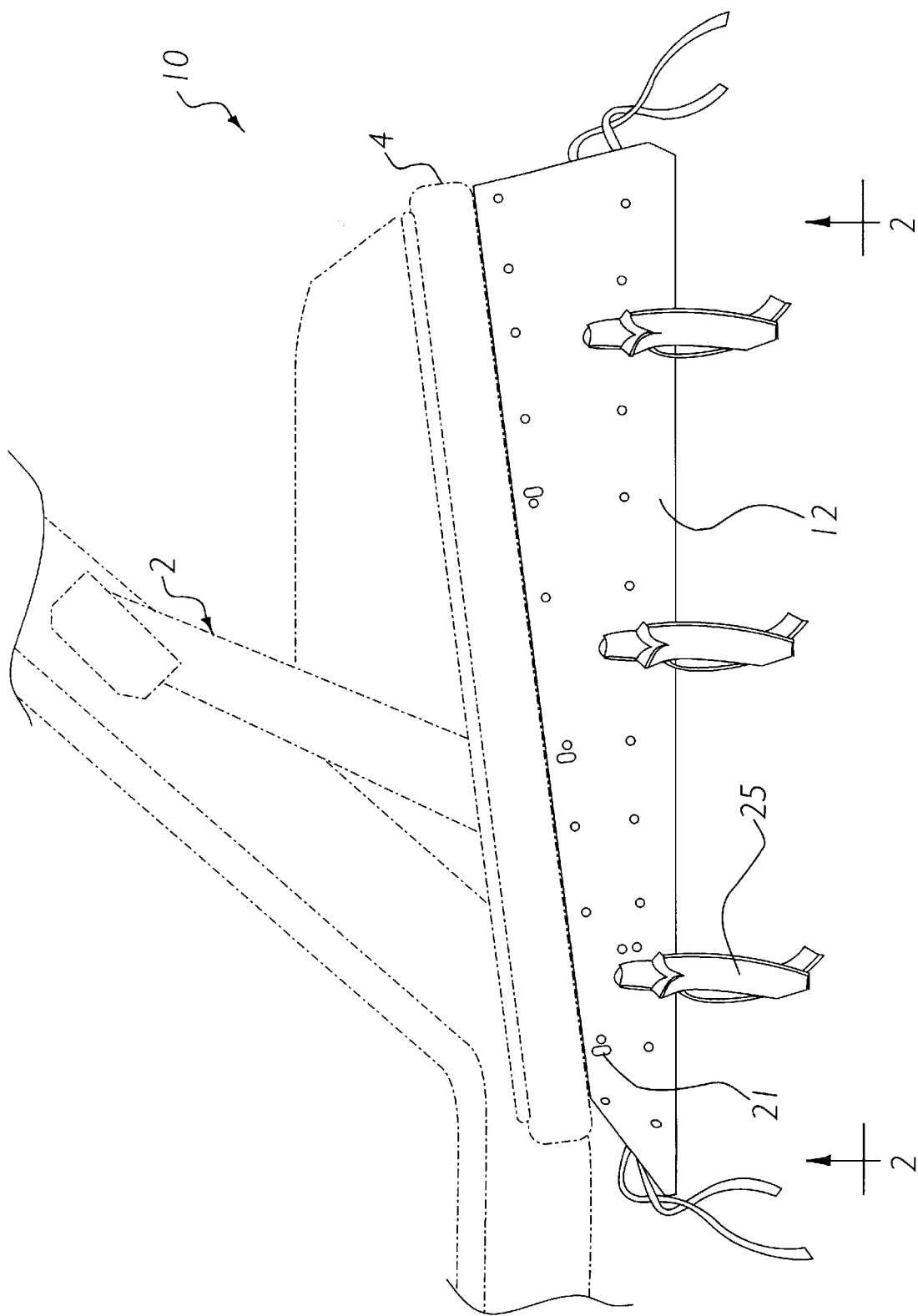
FIG. 1 is a side view of a new Motorcycle Running Board Skirt installed on a motorcycle according to the present invention.
Figure 2:
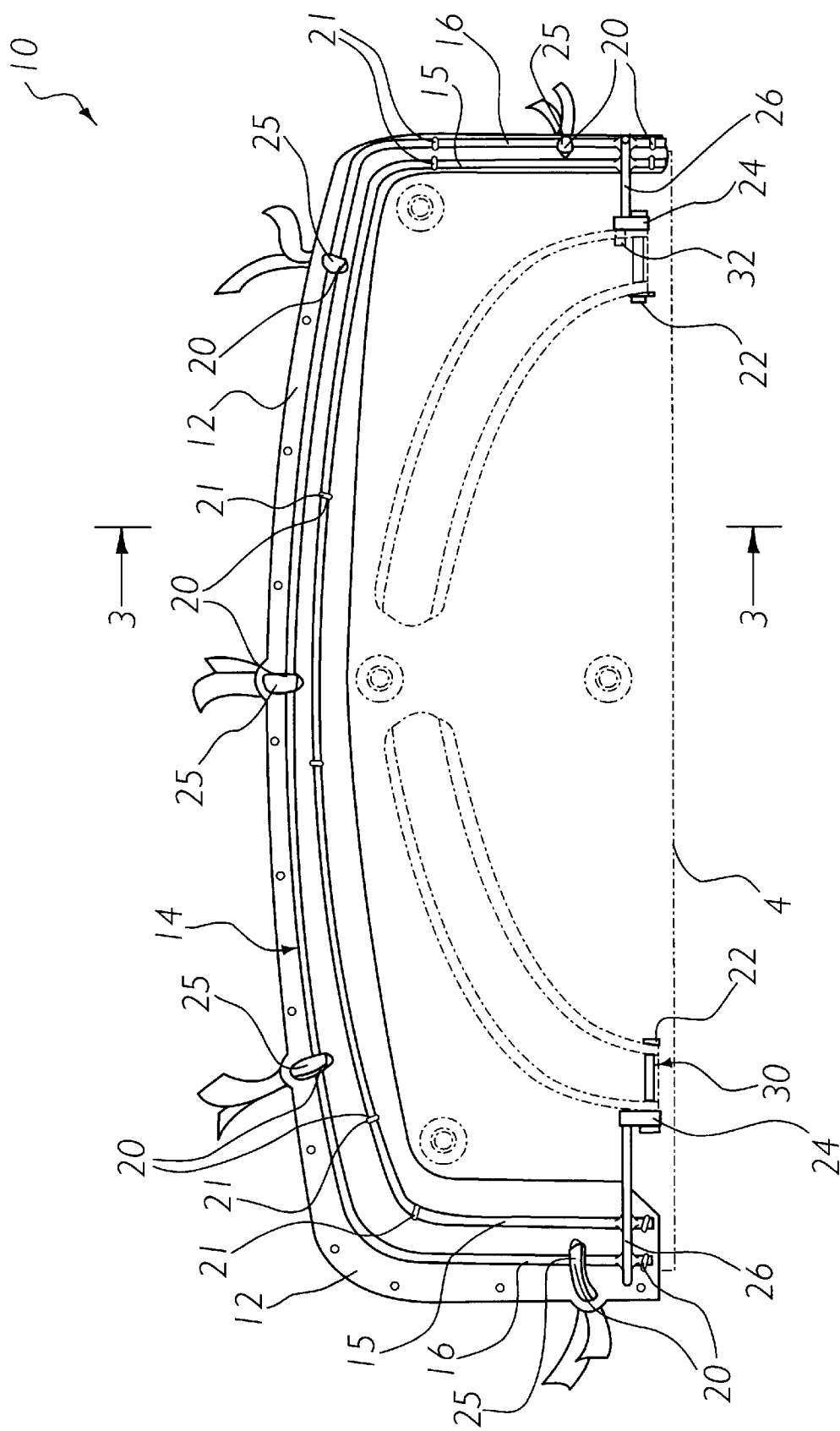
FIG. 2 is a bottom view of the present invention.
Figure 3:
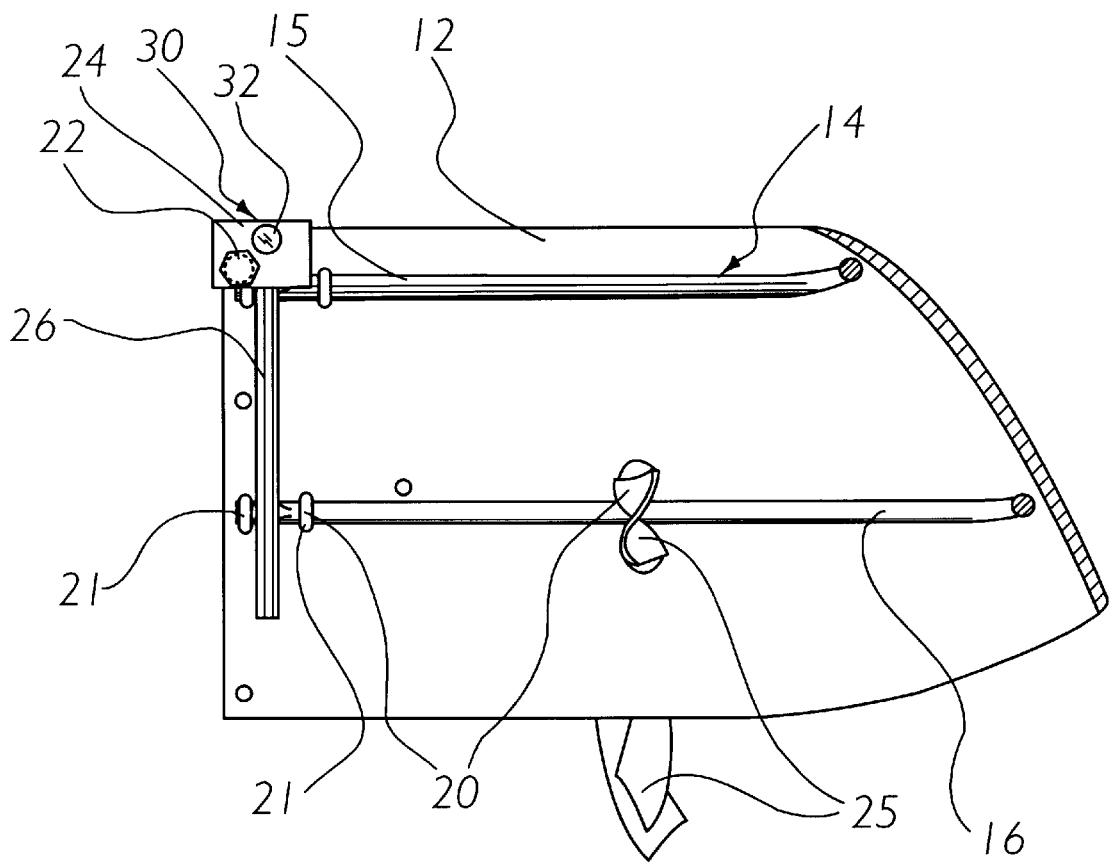
FIG. 3 is a cross sectional view of a new Motorcycle Running Board Skirt according to the present invention.

With reference now to the drawings, and in particular to FIGS. 1 through 3 thereof, a new Motorcycle Running Board Skirt embodying the principles and concepts of the present invention and generally designated by the reference numeral 10 will be described.

More specifically, it will be noted that the Motorcycle Running Board Skirt 10 comprises a cover 12, a frame 14, a cover attachment means 20, and a skirt attachment means 30 where the cover attachment means 20 is used to attach the cover 12 to the frame 14 and the skirt attachment means 30 is used to attach the Motorcycle Running Board Skirt 10 to a running board 4 of a motorcycle 2.

As best illustrated in FIGS. 1 through 3, it can be shown that the frame 14 is comprised of a plurality of walls which extend down from the running board 4 when the Motorcycle Running Board Skirt 10 is installed on the running board 4 of the motorcycle 2. While the frame 14 could protrude down from the entire perimeter of the running board 4, in the preferred embodiment, the frame 14 only protrudes down from outside exposed sides of the running board 4 and therefore is a three sided structure extending down from a front, a back, and an outer side of the running board 4. Additionally, in the preferred embodiment, the frame 14 is comprised of an upper frame bar 15 and a lower frame bar 16 where the upper frame bar 15 and the lower frame bar 16 are further defined as elongated rods where the lower frame bar 16 is longer than the upper frame bar 15 and each is attached to at least one frame support 26. Again, in the preferred embodiment, there are two frame supports 26 where each frame support 26 is orthogonally attached across the lower frame bar 16 and the upper frame bar 15 adjacent to their ends. The shape of the frame 14, because the lower frame bar 16 is longer than the upper frame bar 15, is angle flared out from a top to a bottom where the top is held in contact with an underside of the running board 4.

The frame supports 26 each have a bend which causes their upper ends to be inline and concentrically coplanar and pointed toward one another and terminating so that the upper ends are a spaced distance away from one another. The frame supports 26 can be further defined as a first frame support and a second frame support where the first frame support has a much sharper bend ranging substantially from 75 to 89 degrees and preferably 85 degrees and the second frame support has a much more shallow bend ranging substantially from 25 to 55 degrees and preferably 30 to 45 degrees where the bends accommodate and define a front flare and a rear flare of the Motorcycle Running Board Skirt 10. The flares have an ornamental value which leads to sales as well as a functional value which allows the Motorcycle Running Board Skirt 10 to avoid some contact with the ground and to survive other contact with the ground.

Furthermore, the upper ends of the frame supports 26 each include a base tab 24 which is fixedly attached to the frame supports 26 and where the base tab 24 mates with and removably joins to the skirt attachment means 30 and where the skirt attachment means 30 is further defined as the base tab 24 further including an aperture which threadedly mates with a shoulder bolt 22 of the running board 4 of the motorcycle 2.

The skirt attachment means 30 further comprises a retention tab 32 which is an extension protrusion of one of the frame supports 26 which penetrates and protrudes through one of the base tabs 24 and therefore extends out of an inner side of this base tab 24 and where this retention tab 32 is used to retain the Motorcycle Running Board Skirt 10 from pivotal rotation as it is mounted to the running board 4 of the motorcycle 2.

The cover 12 is fixedly held to the frame 14 by a plurality of metal tie tabs 21 and leather tie straps 25 where the metal tie tabs 21 are pinched together and the leather tie straps 25 are tied together around portions of the cover 12 and the frame 14.

In use, the Motorcycle Running Board Skirt 10 is fastened to an underside of a running board 4 of a motorcycle 2 by using the same shoulder bolts 22 as provided with the motorcycle 2. The Motorcycle Running Board Skirt 10 has a frame 14 which is flexible in order to survive contact with the ground and a cover 12 which has a shape that avoids contact with the ground.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Motorcycle Running Board Skirt comprising: a cover, a frame, a cover attachment means, and a skirt attachment means where the cover attachment means is used to attach the cover to the frame and the skirt attachment means is used to attach the Motorcycle Running Board Skirt to a running board of a motorcycle, wherein the frame is comprised of a plurality of walls which extend down from the running board when the Motorcycle Running Board Skirt is installed on the running board of the motorcycle.

2. The Motorcycle Running Board Skirt of claim 1, wherein the frame protrudes down from the entire perimeter of the running board.

3. The Motorcycle Running Board Skirt of claim 1, wherein the frame only protrudes down from outside exposed sides of the running board and therefore is a three sided structure extending down from a front, a back, and an outer side of the running board.

4. The Motorcycle Running Board Skirt of claim 3, wherein the frame is comprised of an upper frame bar and a lower frame bar where the upper frame bar and the lower frame bar are further defined as elongated rods where the lower frame bar is longer than the upper frame bar and each is attached to at least one frame support.

5. The Motorcycle Running Board Skirt of claim 4, wherein there are two frame supports and where each frame support is orthogonally attached across the lower frame bar and the upper frame bar adjacent to their ends and where the shape of the frame is angle flared out from a top to a bottom where the top is held in contact with an underside of the running board.

6. The Motorcycle Running Board Skirt of claim 5, wherein the frame supports each have a bend which causes their upper ends to be inline and concentrically coplanar and pointed toward one another and terminating so that the upper ends are a spaced distance away from one another.

7. The Motorcycle Running Board Skirt of claim 6, wherein the frame supports can be further defined as a first frame support and a second frame support where the first frame support has a much sharper bend and the second frame support has a much more shallow bend and where the bends accommodate and define a front flare and a rear flare and where said flares have a functional value which avoids some contact with the ground and where the frame is flexible enough to survive other contact with the ground.

8. The Motorcycle Running Board Skirt of claim 7, where the upper ends of the frame supports each include a base tab which is fixedly attached to the frame supports and where the base tab mates with and removably joins to the skirt attachment means and where the skirt attachment means is further defined as the base tab further including an aperture which threadedly mates with a shoulder bolt of the running board of the motorcycle.

9. The Motorcycle Running Board Skirt of claim 8, where said skirt attachment means further comprises a retention tab which is an extension protrusion of one of the frame supports which penetrates and protrudes through one of the base tabs and therefore extends out of an inner side of this base tab and where this retention tab is used to retain the Motorcycle Running Board Skirt from pivotal rotation as it is mounted to the running board of the motorcycle.

10. The Motorcycle Running Board Skirt of claim 9, where the cover is fixedly held to the frame by a plurality of metal tie tabs and leather tie straps and where the metal tie tabs are pinched together and the leather tie straps are tied together around portions of the cover and the frame.

11. A Motorcycle Running Board Skirt where in use, the Motorcycle Running Board Skirt is fastened to an underside of a running board of a motorcycle by using the same shoulder bolts as provided with the motorcycle and where the Motorcycle Running Board Skirt has a frame which is flexible in order to survive contact with the ground and a cover which has a shape that avoids contact with the ground, wherein the frame is comprised of a plurality of walls which extend down from the running board when the Motorcycle Running Board Skirt is installed on the running board of the motorcycle.

* * * * *